(12) United States Patent
Fujiwara et al.

(10) Patent No.: US 10,392,283 B2
(45) Date of Patent: Aug. 27, 2019

(54) METHOD AND APPARATUS FOR TREATING ACCOMPANIED WATER FROM A WELL

(71) Applicant: JFE ENGINEERING CORPORATION, Tokyo (JP)

(72) Inventors: Shigeki Fujiwara, Tokyo (JP); Eri Watanabe, Tokyo (JP); Yohei Tomida, Tokyo (JP); Koji Fuchigami, Tokyo (JP); Takeshi Tsuji, Tokyo (JP); Yasuhiro Minamizato, Tokyo (JP); Yasuto Ando, Tokyo (JP); Yoshitaka Moriyama, Tokyo (JP)

(73) Assignee: JFE ENGINEERING CORPORATION, Tokyo (JP)

( * ) Notice: Subject to any disclaimer, the term of this patent is extended or adjusted under 35 U.S.C. 154(b) by 690 days.

(21) Appl. No.: 14/513,445

(22) Filed: Oct. 14, 2014

(65) Prior Publication Data

US 2015/0034556 A1    Feb. 5, 2015

Related U.S. Application Data

(63) Continuation of application No. PCT/JP2012/007552, filed on Nov. 26, 2012.

(30) Foreign Application Priority Data

Apr. 11, 2012    (JP) .................. 2012-090536

(51) Int. Cl.
*C02F 9/00*    (2006.01)
*B01D 61/04*    (2006.01)
(Continued)

(52) U.S. Cl.
CPC ............... *C02F 9/00* (2013.01); *B01D 61/04* (2013.01); *B01D 61/16* (2013.01); *B01D 61/58* (2013.01);
(Continued)

(58) Field of Classification Search
CPC .... C02F 9/00; C02F 1/04; C02F 1/441; C02F 1/52; C02F 1/66; C02F 1/048;
(Continued)

(56) References Cited

U.S. PATENT DOCUMENTS

| | | |
|---|---|---|
| 5,501,798 A | 3/1996 | Al-Samadi et al. |
| 7,520,993 B1 | 4/2009 | Laraway et al. |

(Continued)

FOREIGN PATENT DOCUMENTS

| | | |
|---|---|---|
| JP | 59-016588 | 1/1984 |
| JP | 09-019687 | 1/1997 |

(Continued)

OTHER PUBLICATIONS

2005, Arthur et al., Technical Summary of Oil & Gas Produced Water Treatment Technologies, All Consulting, Tulsa OK.*

(Continued)

*Primary Examiner* — Allison G Fitzsimmons
(74) *Attorney, Agent, or Firm* — Cermak Nakajima & McGowan LLP; Adam J. Cermak

(57) ABSTRACT

A method and apparatus for removing soluble silica efficiently from accompanied water, produced from wells containing calcium ion, soluble silica, and sulfate ion, and not clogging a reverse osmosis membrane in the reverse osmosis membrane treatment process after that, includes adding a magnesium salt to mix with the accompanied water under alkaline conditions to produce insoluble silica and calcium sulfate. A microfiltration (MF) membrane treatment process includes treating a first reaction solution obtained in said magnesium salt adding process, with a microfiltration membrane to separate insolubilized silica and calcium sulfate by filtration. An acid adding process includes adding an acid to and mixing with filtrate obtained in the MF membrane treatment process to render a pH value of the filtrate on the (Continued)

range from 5 to 9 and a negative Langeliar saturation index. A reverse osmosis membrane treatment process includes treating a second reaction solution, obtained in the acid adding process, with a reverse osmosis membrane to obtain fresh water and membrane concentrates.

4 Claims, 4 Drawing Sheets

(51) Int. Cl.
*B01D 61/16* (2006.01)
*B01D 61/58* (2006.01)
*C02F 1/44* (2006.01)
*C02F 1/66* (2006.01)
*C02F 1/04* (2006.01)
*C02F 1/52* (2006.01)
B01D 61/02 (2006.01)
B01D 61/14 (2006.01)
C02F 1/56 (2006.01)
C02F 101/10 (2006.01)
C02F 103/06 (2006.01)
C02F 103/10 (2006.01)

(52) U.S. Cl.
CPC .............. *C02F 1/04* (2013.01); *C02F 1/441* (2013.01); *C02F 1/52* (2013.01); *C02F 1/66* (2013.01); *B01D 61/025* (2013.01); *B01D 61/147* (2013.01); *B01D 2311/04* (2013.01); *B01D 2311/08* (2013.01); *B01D 2311/12* (2013.01); *B01D 2311/263* (2013.01); *B01D 2311/2642* (2013.01); *B01D 2311/2673* (2013.01); *C02F 1/048* (2013.01); *C02F 1/444* (2013.01); *C02F 1/5236* (2013.01); *C02F 1/56* (2013.01); *C02F 2001/5218* (2013.01); *C02F 2101/10* (2013.01); *C02F 2101/101* (2013.01); *C02F 2103/06* (2013.01); *C02F 2103/10* (2013.01)

(58) Field of Classification Search
CPC .......... C02F 1/444; C02F 1/5236; C02F 1/56; C02F 2101/10; C02F 2101/101; C02F 2103/06; C02F 2103/10; C02F 2001/5218; B01D 61/04; B01D 61/16; B01D 61/58; B01D 61/025; B01D 61/147
USPC ....... 210/638, 639, 681, 683, 687, 767, 806, 210/295, 314, 483
See application file for complete search history.

(56) References Cited

U.S. PATENT DOCUMENTS

| 2002/0125191 | A1 | 9/2002 | Mukhopadhyay | |
| 2003/0173296 | A1* | 9/2003 | Costa | B01D 61/04 210/639 |
| 2006/0231491 | A1* | 10/2006 | Mukhopadhyay | B01D 61/022 210/639 |
| 2011/0168629 | A1* | 7/2011 | Minnich | B01D 17/02 210/638 |
| 2012/0055875 | A1 | 3/2012 | Lien | |

FOREIGN PATENT DOCUMENTS

| JP | 2000-015257 | 1/2000 |
| JP | 2000-511109 | 8/2000 |
| JP | 2004141799 | 5/2004 |
| JP | 2010248431 | 11/2010 |
| JP | 2011147899 | 8/2011 |
| WO | WO02/26362 A1 | 4/2002 |
| WO | WO2011/143775 A1 | 11/2011 |
| WO | WO2012/008013 | 1/2012 |
| WO | WO2013/153587 | 10/2013 |

OTHER PUBLICATIONS

Ray et al., Environmental Science Research, vol. 46, 1992, Cover/Front Matter/ p. 317.*
Extended European Search Report for European Patent App. No. 12874085.9 (dated Dec. 4, 2015).
International Search Report for PCT Patent App. No. PCT/JP2012/007552 (dated Jan. 29, 2013).

* cited by examiner

METHOD AND APPARATUS FOR TREATING ACCOMPANIED WATER FROM A WELL

This application is a Continuation of, and claims priority under 35 U.S.C. § 120 to, International application no. PCT/JP2012/007552, filed 26 Nov. 2012, which claims priority under 35 U.S.C. §§ 119, 365 to Japanese application no. 2012-090536, filed 11 Apr. 2012, the entireties of which are incorporated by reference herein.

BACKGROUND

Field of Endeavor

This invention relates to a method of treating accompanied water from wells produced upon mining natural gas or crude oil from the well of shale gas, oil sand, CBM (coal bed methane), petroleum, or the like.

Brief Description of the Related Art

On mining shale gas, oil sand, CBM (coal bed methane), petroleum, or the like, an aqueous agent solution is sometimes injected as water or steam for digging, for the purpose of improving the output of natural gas or crude oil. As a result, crude oil taken out from an oil stratum contains the aqueous agent solution and underground water containing inorganic ions in the stratum as accompanied water, and the accompanied water is separated from the mined natural gas or crude oil. Since the separated accompanied water contains a salt content, organic materials, suspended solids, and the like, when it is discharged as-is, there is a problem of environmental pollution. Therefore, purification of the water is necessary.

Among the components contained in the accompanied water, soluble silica produces scaling in a process for treating the accompanied water, by adhering to pipes and the inside of apparatuses, and therefore, its removal is an important problem.

In Patent Document 1 (below), a method of removing soluble silica from accompanied water is disclosed, which comprises, after separating oil from accompanied water, adding a magnesium salt and caustic soda to adjust the pH of the accompanied water into the range of 9 to 11, thereby insolubilizing the soluble silica contained in the accompanied water to deposit; then, separating the deposited silica by membrane filtration using a ceramic membrane; thereafter, treating the membrane filtrate, from which the deposited silica has been removed, by a reverse osmosis (RO) membrane, thus, recovering fresh water from the accompanied water by removing residual salts; and evaporating to reuse it.

In Patent Document 2, a method of treating waste water containing silica is disclosed, which comprises adding a treating agent containing at least one kind of the compound selected from iron salts, aluminum salts, and magnesium salts to the water to be treated, depositing flocculates under alkaline conditions at pH 7.5-12, and separating the flocculates to reduce the concentration of silica.

PATENT DOCUMENTS

Patent Document 1: U.S. Patent Application Publication No. 2011/0168629 A1

Patent Document 2: JP 2004-141799 A

SUMMARY

Problems Addressed

According to the method of the above Patent Document 1, since clogging of the RO membrane caused by deposited silica can be prevented in the RO membrane treatment process by insolubilizing soluble silica contained in accompanied water to deposit, and removing the deposited silica, it is possible to improve the recovery of fresh water from the accompanied water.

However it was found that, in the case of treating accompanied water containing a large quantity of calcium ion and sulfate ion, in addition to soluble silica, by that method, according to the pH value of the membrane filtrate, calcium carbonate was deposited which clogged the RO membrane in the RO membrane treatment process.

The method of Patent Document 2 has a problem that, even when a silica remover was added in an amount of 5 times or more of the concentration of silica in the water to be treated, the rate of removal is about 70%, increasing agent cost and an increase of sludge. This is caused by the removal mechanism of silica by aluminum or iron-based agent, which is performed by the flocculation of polymerized silica, adsorption of ionized silica, and that the adsorbed amount depends on the specific surface area. On the other hand, a magnesium-based agent removes silica by forming a compound, such as $MgSiO_3$, and there is a problem that the compound does not form unless rendering in high alkaline conditions. Furthermore, upon treating the accompanied water, from which silica has been removed, with a RO membrane, calcium carbonate sometimes deposits to clog the RO membrane.

Therefore, one of numerous aspects of the invention is a method and apparatus for efficiently removing soluble silica from the accompanied water containing calcium ion and soluble silica produced from wells and not clogging a reverse osmosis membrane in the reverse osmosis membrane treatment process thereafter.

The systems and methods described herein were made in order to address the above problems, and based on the finding that calcium remains in a high concentration in the accompanied water which has been adjusted into the range from exceeding pH 9 to pH 11 for the removal of silica, while deposition of calcium carbonate is inhibited by adjusting the pH into the range from 5 to 9 and the Langeliar saturation index into the negative range, to prevent clogging of the reverse osmosis membrane.

In an embodiment of the invention, to the accompanied water containing calcium ion, soluble silica, and sulfate ion produced from a well, a magnesium salt is added and mixed under alkaline conditions formed by adding caustic soda to insolubilize the soluble silica to deposit it. Thereafter, the solution is filtered by a microfiltration (MF) membrane to separate deposited silica, thereby removing it. On this occasion, sulfate ion reacts with calcium ion to deposit as gypsum ($CaSO_4$), and is separated and removed together with the silica. However, most of calcium ion passes the MF membrane and remains in the MF filtrate. Thereafter, the MF membrane filtrate is treated with a RO membrane. Importantly, calcium salts contained in the MF filtrate are not allowed to deposit, and, for this purpose, the MF filtrate is kept at a pH value in the range from 5 to 9, and the Langeliar saturation index in the negative range, by adding hydrochloric acid to the MF filtrate. Then, the solution is treated with a RO membrane to concentrate the dissolved salts and simultaneously to recover fresh water.

Thus, another aspect of the present invention includes a method of treating accompanied water, which comprises a magnesium salt adding process, wherein a magnesium salt is added to mix with the accompanied water containing calcium ion, soluble silica, and sulfate ion produced from a well under alkaline conditions to produce insoluble silica and calcium sulfate; a MF membrane treatment process, wherein a first reaction solution obtained in the above magnesium salt adding process is treated with a MF membrane to separate the insolubilized silica and calcium sulfate by filtration; an acid adding process, wherein an acid is added to and mixed with the filtrate obtained in the above MF membrane treatment process to render the pH value of the above filtrate into the range from 5 to 9 and the Langeliar saturation index into the negative range; and a reverse osmosis membrane treatment process, wherein a second reaction solution obtained in the above acid adding process is treated with a RO membrane to obtain fresh water and membrane concentrates.

Another aspect of the present invention includes an apparatus useful for treating accompanied water, which comprises a streaming means of the accompanied water containing calcium ion, soluble silica, and sulfate ion produced from a well, an agent adding means of an alkaline agent and a magnesium salt, a first reaction vessel having a run off means of liquid in the vessel, a microfiltration membrane apparatus provided on the downstream side of the above first reaction vessel, a streaming means of the filtrate run off from the above MF membrane apparatus, and acid adding means, a second reaction vessel having a run off means of liquid in the vessel, and a RO membrane apparatus provided on the downstream side of the above second reaction vessel, wherein an adjustment means is provided for adjusting reaction solution run off from the above second reaction vessel into the range of pH 5 to 9 and a Langeliar saturation index being into the negative range.

Moreover, in the systems and methods described herein, it was found that when a water-soluble magnesium salt and a water-soluble aluminum salt are added at a specific ratio to the accompanied water, containing calcium ion and a water-soluble organic material produced from a well, hydrotalcite-like bulky hydroxide precipitates are produced. The hydrotalcite-like precipitates include a lot of water of hydration, and have a property of adsorbing various anions in their stereostructure. By utilizing this property, removal of silica is improved.

In addition, it was also found that the adsorbed concentration of silica is increased by reducing the carbonate ion concentration in water.

Therefore, yet another aspect of the present invention includes a method of treating accompanied water, which comprises a silica deposition treatment process, wherein a water-soluble magnesium salt and a water-soluble aluminum salt are added at a ratio of 1 to 2 by (Mg+Al)/SiO2 (molar ratio) and 1 to 4 by Mg/Al (molar ratio) to the accompanied water containing calcium ion, soluble silica, and a water-soluble organic material produced from a well, and adjusting the pH value to the range from 10.5 to 11 by adding an alkali to produce insoluble silica; a flocculation treatment process, wherein a polymer flocculant is added to and mixed with a first reaction solution obtained in the above silica deposition treatment process; a solid-liquid separation process, wherein solid-liquid separation of the treated water obtained in the above flocculation treatment process is conducted; an acid adding process, wherein an acid is added to and mixed with the separated water obtained in the above solid-liquid separation process to render pH value of the above separated water into the range from 5 to 9 and the Langeliar saturation index into the negative range, and a RO membrane treatment process wherein a second reaction solution obtained in the above acid adding process is treated with a RO membrane to obtain fresh water and membrane concentrates.

Another aspect includes the above accompanied water-treating method, wherein the above silica deposition process is conducted under a nitrogen atmosphere.

Yet another aspect includes an apparatus useful for treating accompanied water, which comprises a streaming means of the accompanied water containing calcium ion, soluble silica, and water-soluble organic material produced from a well, a means for adding a water-soluble magnesium salt and a water-soluble aluminum salt at a prescribed blending amount, an alkali adding means, a first reaction vessel having a run off means of liquid in the vessel, a flocculation vessel having a streaming means of a first reaction solution in the first reaction vessel and an addition means for a polymer flocculant, a solid-liquid separation means for flocculated solution run off from the above flocculation vessel, a streaming means for separated water run off from the above solid-liquid separation means, an acid addition means, a second reaction vessel having a run off means for liquid in the vessel, and a reverse osmosis membrane apparatus provided on the downstream side of the above second reaction vessel, wherein a first adjustment means for adjusting the liquid in the first reaction vessel into the range from pH 10.5 to 11, and a second adjustment means for adjusting the second reaction solution run off from the second reaction vessel into the range from pH 5 to 9 and the Langeliar saturation index being into the negative range, are provided.

Yet another aspect includes the above accompanied water-treating apparatus, wherein the first reaction vessel has a means for replacing the atmosphere in the vessel by nitrogen or a means of sparging nitrogen into the liquid in the vessel.

Effects

According to principles of the present invention, soluble silica is efficiently removed from the accompanied water containing calcium ion and soluble silica, to address the problem of the deposition of silica on the inside of the apparatus and pipes which treat the accompanied water, and further to inhibit or prevent the deposition of calcium carbonate, and thereby, fresh water can efficiently be manufactured and treat the accompanied water.

DETAILED DESCRIPTION OF EXEMPLARY EMBODIMENTS

Figure 1:
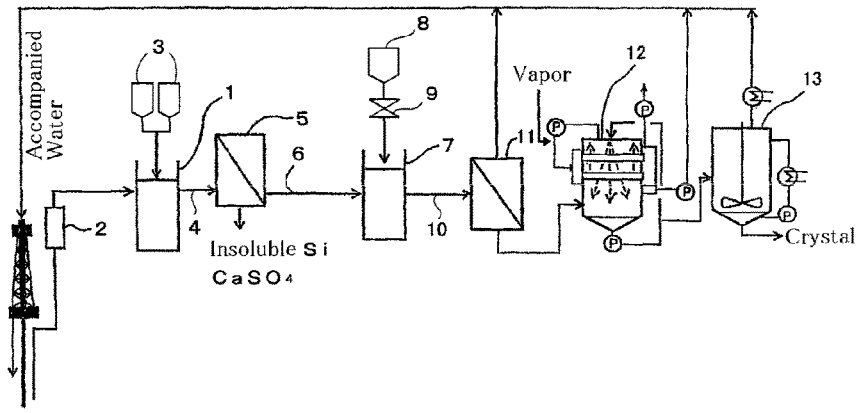
FIG. 1 is a drawing illustrating a schematic construction of an accompanied water-treating apparatus which is an exemplary embodiment of the invention.

Wells are not restricted so long as they discharge accompanied water, and examples are wells for mining shale gas, oil sand, CBM (coal bed methane), petroleum, or the like.

The accompanied water is discharged together with the object to be mined from wells, and contains salt content, organic materials, suspensoids, and the like. As the concentration of contaminants, for example, evaporation residues (mainly, $Na+$, $K+$, $Ca2+$, $Cl-$, $SO4^{2-}$, and the like) is in the range of 1,000 mg/L-100,000 mg/L, organic materials (oils, added agents and the like) is 10 mg/L-1,000 mg/L as TOC, and suspended solids is 100-10,000 mg/L. Among the evaporation residues, Si is 40 mg/L-1,000 mg/L, typically 40 mg/L-200 mg/L, $Ca2+$ is 50 mg/L-10,000 mg/L, typically 100 mg/L-5,000 mg/L, and $SO4^{2-}$ is 20 mg/L-1,000 mg/L, typically 20 mg/L-200 mg/L. The concentration of carbonates is 10 mg/L-1,000 mg/L, typically 10 mg/L-100 mg/L.

The separation device for the accompanied water is not critical, and for example, oils are separated from water by sedimentation or the like.

A first embodiment of the system and process described herein includes: a magnesium salt adding process, wherein a magnesium salt is added to mix with the accompanied water containing calcium ion, soluble silica, and sulfate ion produced from a well under alkaline conditions, to produce insoluble silica and calcium sulfate; a microfiltration membrane treatment process, in which a first reaction solution obtained in the above magnesium salt adding process is treated with a microfiltration (MF) membrane to separate the insolubilized silica and calcium sulfate by filtration; an acid adding process, wherein an acid is added to and mixed with filtrate obtained in the above MF membrane treatment process to render the pH value of the above filtrate into the range from 5 to 9 and a Langeliar saturation index into the negative range; and a RO membrane treatment process, wherein a second reaction solution, obtained in the above acid adding process, is treated with a RO membrane to obtain fresh water and membrane concentrates.

Magnesium Salt Adding Process

Preferred magnesium salts are soluble in an aqueous alkaline solution, and magnesium chloride, magnesium oxide, magnesium carbonate, and the like are usable. A suitable amount of magnesium to be added is about 1 to 4, preferably about 1 to 2, as a molar ratio to silica. The form to be added may be any form of aqueous solution, slurry, powder, or the like.

The reaction is carried out under alkaline conditions, to silica insoluble. A suitable pH is about 7-8 prior to adding magnesium salt, and about 10.5-11 of the supernatant from which insoluble silica and calcium sulfate has been precipitated. The alkali to be added may be any one capable of adjusting to a prescribed pH, and sodium hydroxide is preferred. Whereas, sodium carbonate is not preferable, because of the simultaneous depositing of a lot of calcium carbonate, and its separation and disposal becomes a burden.

The reaction to produce insoluble silica finishes within about 10 minutes to 1 hour.

MF Membrane Treatment Process

The obtained first reaction solution is filtered by a MF membrane to separate the produced insoluble silica and calcium sulfate. As the MF membrane, a conventional membrane can be used, for example, made of cellulose acetate, polytetrafluoroethylene, polysulfone, polyvinyl chloride, or the like, and in addition, a ceramic membrane, a porous glass membrane, and the like can also be utilized. Preferred pore size is not particularly specified, but 0.1 μm or less is desirable. In the MF membrane treatment, filtrate which passed through the MF membrane is obtained, and suspended solids containing insoluble silica and calcium sulfate trapped by the MF membrane are discharged by backwashing, conducted at regular intervals. The volume of the suspended solids in the backwash water is decreased through a solid-liquid separation process such as a precipitation tank, and discarded, and the supernatant is returned to the raw water being treated.

Acid Adding Process

In the process, it was found that calcium remains in a high concentration in the filtrate separated in the MF membrane treatment process.

Figure 4:
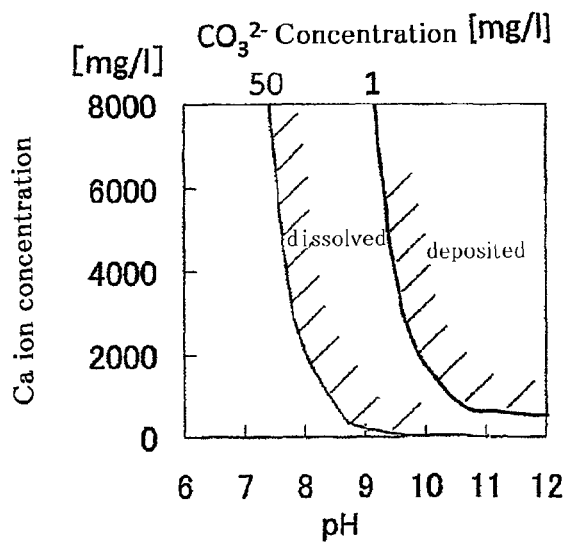
FIG. 4 is a graph showing a relationship between the pH value of membrane filtrate and Ca ion concentration.
Figure 5:
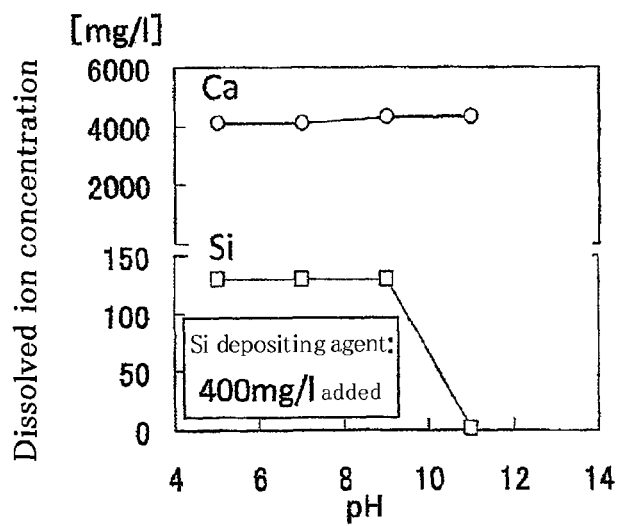
FIG. 5 is a graph showing a relationship between the pH value of membrane filtrate and residual ion concentrations of Ca and Si.

FIG. 4 is a graph showing a relationship between the pH value of filtrate and Ca ion concentration, and FIG. 5 is a graph showing a relationship between the pH value of filtrate and residual ion concentrations of Ca and Si.

As is apparent from FIG. 4 and FIG. 5, regarding Si, a clogging problem of RO membrane does not occur, because it deposits by adjusting the pH value of the filtrate into the range from 9 to 11. However, regarding calcium ion, it can be seen that it remains in the filtrate as it is dissolved. It also can be seen that when the amount is large, it deposits in the RO membrane treatment process, according to the pH value of the filtrate, and it is possible to clog the RO membrane.

As is apparent from the relationship between pH and saturated Ca concentration in different carbonate ion concentrations, when the carbonate ion concentration is 1 mg/L or less, calcium carbonate does not deposit even when the Ca concentration is about 8,000 mg/L at a pH 9 or lower.

Thus, since carbonate ion contained in the raw water is deposited and separated as calcium carbonate in the Si removal process to be able to make the carbonate ion concentration 1 mg/L or less, deposition of calcium carbonate ion can be inhibited by rendering the filtrate at pH 9 or less.

At a pH of lower than 5, it is possible to adversely influence the material of components of the RO membrane module, and therefore, the pH is set 5 or more. A preferable pH range is pH 6-8, and pH 6.5-7.5 is particularly preferred.

As the acid, hydrochloric acid, sulfuric acid, and the like can be used.

The Langeliar saturation index (LSI) is, as disclosed in JP 2011-147899A, used mainly as an indication for evaluating corrosion tendency and scale tendency by water in a water supply system, and represented by the following formula (1):

$$LSI = pH - pHs$$

pH is the actual pH value of the water, and pHs is a theoretical value in the equilibrium condition where calcium carbonate in water is neither dissolved nor deposited.

$$pHs = 8.313 - \log(Ca2+) \log(A) + S$$

$$Ca2+(meg/L) \ldots Ca2+(mg/L) \div (40.1 \div 2)$$

$$A(\text{total alkalinity}) (meg/L) \ldots \text{Total Alkalinity} (mg/L) \div (100 \div 2)$$

The total alkalinity is an indication of the alkali contents contained in water, such as hydrogen carbonates, carbonates, and hydroxides. The total alkalinity in natural water is mostly composed of carbonates or hydrogen carbonates as principal components, and in the case that the total alkalinity is high, it indicates that there are many substances producing deposits by combining with hardness components, such as Ca and Mg. The total alkalinity (mg/L) is the acid consumption until pH 4.8, and can be analyzed by titrating using hydrochloric acid or sulfuric acid.

$$S \ldots 2\sqrt{\mu} \div (1+\sqrt{\mu})\ \mu=2.5\times10^{-5}\times sd$$

sd is soluble substance concentration (mg/L)

In the process, the Langeliar saturation index is made so as to be negative, preferably in the range of −0.5-less than 0. When the Langeliar saturation index is positive, clogging of the RO membrane tends to occur, caused by the deposition of scale components. Whereas, when the Langeliar saturation index is lower than −0.5, it is considered that the treated water by the reverse osmosis membrane becomes lower than pH 6 to require charging of an alkali agent, such as caustic soda, into the RO membrane-treated water.

In order to adjust the Langeliar saturation index to less than 0 (zero), for example, when any of pH value, soluble substance concentration, calcium concentration, and total alkalinity of the water to be treated increases, the Langeliar saturation index increases. By increasing the charging amount of an acid agent by a pH adjusting agent adding apparatus, the Langeliar saturation index can be adjusted down.

RO Membrane Treatment Process

The second reaction solution obtained in the acid adding process is treated with a RO membrane apparatus to obtain fresh water and membrane concentrates. As the RO membrane, a conventional membrane can be used, made of various materials, such as cellulose acetate, polysulfone, aliphatic polyamide, or aromatic polyamide. The apparatus to be used may also be a commercial RO membrane apparatus.

Obtained fresh water can be utilized for various uses, and can be reused as the digging water of wells, and thereby, the volume of discharge water out of the system can be reduced.

Membrane concentrates contain salts in a high concentration. Although it can be utilized or pressed into unworked wells, it is preferably further treated. As the treating method, there is a method of heating to further concentrate, and thereby salts are crystallized.

Evaporation Process

The RO membrane concentrates are heated to further concentrate. The concentration may be conducted at an ordinary pressure or under reduced pressure conditions. Vapor generated through the concentration may be discharged. Or, it can be condensed by using a heat exchanger or the like to obtain fresh water, and reused for digging water or the like.

Crystallization Process

The further concentrates obtained in the evaporation process can be further concentrated by heating to crystallize salts, followed by separating. At that time, the generated vapor is condensed by using a heat exchanger or the like to obtain fresh water, and it can be reused for digging water or the like. The remaining solution is converted to a slurry by the crystallization of salts. The slurry is subjected to solid-liquid separation, and the mother liquid is discarded. If the crystals contain few environmental contaminants, they can be used for melting snow, or the like.

Processes as described herein can be carried out by using the apparatus for treating accompanied water, including a streaming device for the accompanied water containing calcium ion, soluble silica, and sulfate ion produced from a well, an agent adding device for an alkaline agent and a magnesium salt, a first reaction vessel having a run off for liquid in the vessel, a MF membrane apparatus provided on the downstream side of the first reaction vessel, a streaming device for the filtrate run off from the MF membrane apparatus, an acid adding device, a second reaction vessel having a run off device for liquid in the vessel, and a RO membrane apparatus provided on the downstream side of the second reaction vessel, wherein an adjustment device is provided for adjusting reaction solution run off from the above second reaction vessel into the range of pH 5 to 9 and a Langeliar saturation index being in the negative range.

An embodiment of an apparatus for treating accompanied water will be explained with reference to FIG. 1.

In FIG. 1, 1 is a first reaction vessel having a run off 4 for liquid in the vessel. Accompanied water containing calcium ion, soluble silica, and sulfate ion produced from a well is streamed into the first reaction vessel 1 by a streaming device 2. The reaction vessel may be in a conventional form, such as cylinder or box-shaped, and preferably provided with a stirrer, a pH meter, and so on. The streaming device 2 is composed of pipes, a pump, a flow control valve, a water level indicator, and so on. The agent adding device 3 is for adding an alkali, such as NaOH, and a magnesium salt, such as MgCl2, to the accompanied water in the first reaction vessel 1, and is composed of tanks for containing respective agents, pipes, flow control valves, water level indicators, and so on. The run off device 4 for liquid in the vessel is composed of pipes, on-off valves, and so on.

The first reaction solution, which was run off from the first reaction vessel 1 by the run off device 4, enters the MF membrane apparatus 5, and insoluble silica and calcium sulfate produced in the first reaction vessel 1 are separated by filtration there.

The filtrate separated by the MF membrane apparatus 5 flows into the second reaction vessel 7 through a streaming device 6. The streaming device 6 is composed of pipes, an on-off valve, a pump, and so on. The second reaction vessel 7 may be in a conventional form, such as cylinder or box-shaped, and may be provided with a stirrer, a pH meter, and the like.

The second reaction vessel 7 is provided with an acid adding device 8. The acid adding device 8 is composed of a tank for containing acid, such as HCl, pipe, a water level indicator, and so on. To the acid adding device 8, an adjustment device 9 is added. The adjustment device 9 is composed of a flow control valve, a pH meter, and so on.

The second reaction solution, obtained by the reaction in the second reaction vessel 7, is delivered to the RO membrane apparatus 11 through the run off device 10 for liquid in the vessel 7. The run off device for liquid in the vessel 7 is composed of a pipe, an on-off value, a pump, and so on.

In the RO membrane apparatus 11, the second reaction solution is separated into fresh water and RO membrane concentrates, and the fresh water is delivered to wells as digging water.

On the other hand, the RO membrane concentrates are delivered to an evaporation apparatus 12, and further concentrated. As the evaporation apparatus, usual evaporators, i.e., single evaporator, multi-effect evaporator, thermo-compression evaporator, multi-flash evaporator, or the like can be used. The evaporation may be conducted at ordinary pressure or reduced pressure according to the heat source. The vapor generated in the evaporation is condensed by heat-exchange, and the obtained fresh water is delivered to wells as digging water.

The remaining concentrates after the evaporation is delivered to a crystallization apparatus 13, and further concentrated by evaporation to crystallize the salts contained therein. At that time, generated vapor is condensed, and obtained fresh water is delivered to wells as digging water. On the other hand, the remaining slurry is subjected to solid-liquid separation by a process, such as centrifugation, and then, discarded or utilized as snow melting agent or the like.

In another embodiment of the processes described herein, silica is removed by adding a silica depositing agent, containing a water-soluble magnesium and a water-soluble aluminum, to a discharged water containing calcium, soluble silica, and water-soluble organic material, and rendering pH to alkaline, to produce a composite hydroxide of magnesium and calcium (hydrotalcite-like substance). Thus, this embodiment includes a silica deposition treatment process, in which a water-soluble magnesium salt and a water-soluble aluminum salt are added at a ratio of 1 to 2 by (Mg+Al)/SiO2 (molar ratio) and 1 to 4 by Mg/Al (molar ratio) to the accompanied water containing calcium ion, soluble silica, and a water-soluble organic material produced from a well, and adjusting the pH value to the range from 10.5 to 11 by adding an alkali to produce insoluble silica; a flocculation treatment process, wherein a flocculant is added to and mixed with a first reaction solution obtained in the above silica deposition treatment process; a solid-liquid separation process, wherein solid-liquid separation of the treated water obtained in the flocculation treatment process is conducted; an acid adding process, wherein an acid is added to and mixed with the separated water obtained in the solid-liquid separation process to render the pH value of the above separated water into the range from 5 to 9 and the Langeliar saturation index into the negative range; and a RO membrane treatment process, wherein a second reaction solution, obtained in the above acid adding process, is treated with a RO membrane to obtain fresh water and RO membrane concentrates.

Silica Deposition Treatment Process

Figure 6:
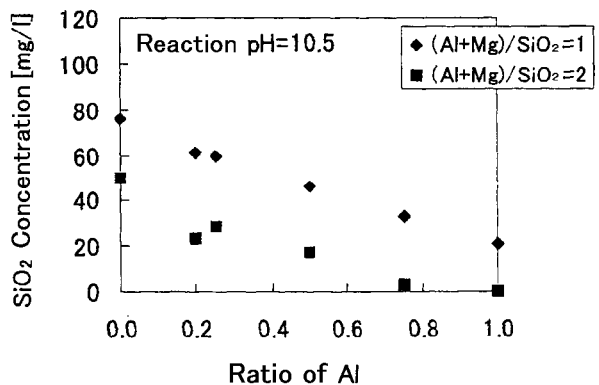
FIG. 6 is a graph showing a relationship between blending ratio of aluminum and concentration of SiO2 after treatment.
Figure 7:
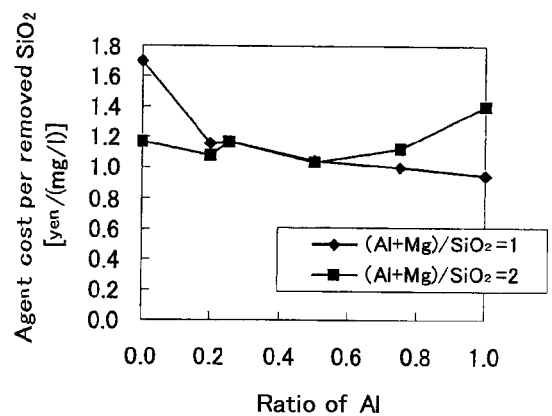
FIG. 7 is a graph showing a relationship between the blending ratio of aluminum and agent cost per removed SiO2, where (Mg+Al)/SiO2 is one and the (Mg+Al)/SiO2 is two.
Figure 8:
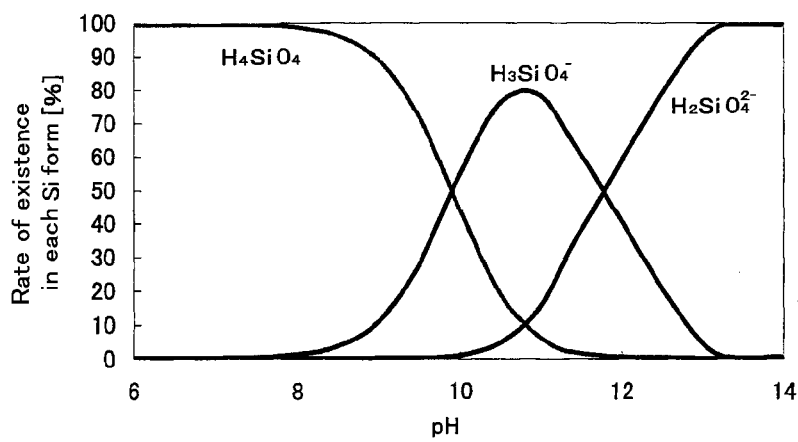
FIG. 8 is a graph showing a relationship between the rate of existence in each Si form and pH.

The water-soluble magnesium salt is magnesium chloride, magnesium nitrate, or the like, and the water-soluble aluminum salt is aluminum chloride, aluminum nitrate, poly (aluminum chloride), or the like. A suitable amount to be added is at a ratio of about 1 to 2 by the molar ratio of (Mg+Al)/SiO2. When the molar ratio is less than 1, the removal performance of silica is insufficient. While, when exceeding 2, unreacted Mg and Al remain to increase agent cost. Moreover, salt concentration increases to add a burden on the reverse osmosis membrane process and the evaporation process in the later stage. A suitable molar ratio of Mg/Al is about 1 to 4. The initial concentration of silicic acid was set 120 mg/L, and when (Mg+Al)/SiO2 was 1 or 2, magnesium chloride and poly(aluminum chloride) were added thereto with varying the ratio of Al, and allowed to react at pH 10.5. The residual concentration of SiO2 was measured, and the results are shown in FIG. 6. In the case that the dissolved silica is in a molecular-shaped, the treatment by Al alone is desirable. However, a problem occurs that, as shown in FIG. 8, the generation of sludge increases to raise sludge treatment cost. On the assumption that aluminum (Al in poly(aluminum chloride)) is 760 yen/kg and magnesium (Mg in magnesium chloride 6 hydrates) is 590 yen/kg, the agent cost per removed SiO2 was calculated, and the results are shown in FIG. 7. As can be seen from FIG. 7, the ratio of Al may be 0.2-0.8, i.e., 4/1-1/4, as Mg/Al. However, since the generation of sludge tends to increase with increasing Al, Mg/Al is preferably in the range of 1 to 4. The above molar ratio is based on the assumption that both of Mg and Al are of one compound. The form to be added may be any form of aqueous solution, slurry, powder or the like, and order of addition may be whichever is earlier or simultaneously.

Figure 9:
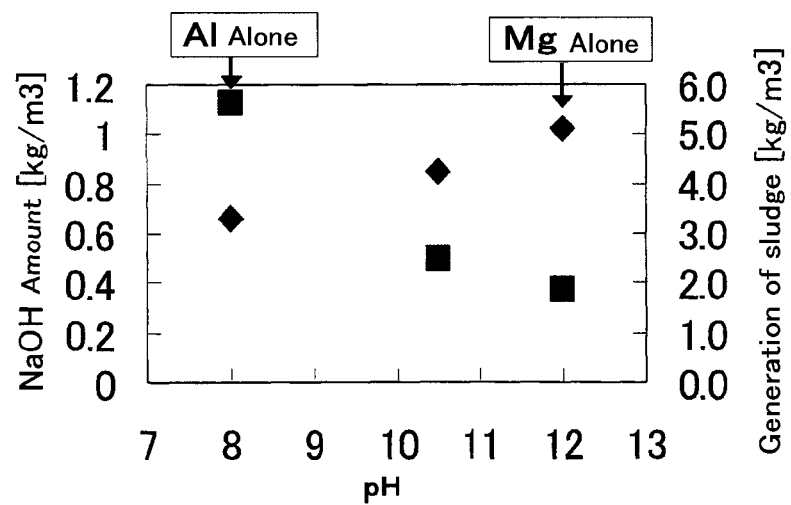
FIG. 9 is a graph showing a relationship between alkali consumption at each pH and generation of sludge.

The reaction is carried out by adding a magnesium salt and an aluminum salt and adjusting the pH value into the range from 10.5 to 11 by adding an alkali. This is because, that although the reaction of magnesium occurs selectively between bivalent SiO4 ion, as shown in FIG. 8, $SiO4^{2-}$ appears at pH 10 or higher, that hydroxides of magnesium are not produced sufficiently at a pH less than 10.5 and a hydrotalcite-like substance does not form, and that when the pH exceeds 11, the removal effect by aluminum hydroxides is reduced by dissolving the aluminum hydroxide as a hydroxide complex ion. The consumption of alkali necessary for decreasing from 100 mg/L Sift to 40 mg/L or less and the generation of sludge (wet weight) were calculated, and the results are shown in FIG. 9. In the figure, ◇ represents alkali consumption, and □ represents the generation of sludge. When Sift is removed at pH 8, only Al is added. In this case, consumption of alkali is a little, but the generation of sludge increases. While, at pH 12, the generation of sludge can be reduced by the addition of Mg alone, but the consumption of alkali increases. As a result of converting the alkali consumption and the generation of sludge into cost, the sum becomes a minimum at pH 10.5. (Mg+Al)/Si=1, and this condition is economically most preferred.

The reaction of adding the magnesium salt and the aluminum salt to the accompanied water to produce insoluble silica terminates within about 10 minutes to one hour.

Furthermore, it is preferred to reduce the dissolution of carbon dioxide from the atmosphere by sealing the reaction vessel completely, substituting the gas phase portion with nitrogen or sparging nitrogen. Since the hydrotalcite-like substance incorporates carbonate ion preferentially, it is desired that the concentration of carbonate ion in water, which inhibits incorporation of other anions including silica, is as small as possible.

Flocculation Treatment Process

A flocculant, preferably a polymer flocculant, is added to the first treated solution obtained in the above silica deposition treatment process to agglomerate the deposited silica. Polyacrylamide-based anion flocculants and the like can be used as the polymer flocculant, and a suitable amount to be added is about 1 mg/L-2 mg/L. The addition is conducted after the deposition of silica. The time for flocculation treatment may be about 15 minutes to 1 hour after the deposition of silica.

Solid-Liquid Separation Process

When the flocculation treatment of deposited silica is finished, the separation of flocculated matter is conducted. As the operation process, sedimentation, centrifugation, filtration, and the like can be utilized.

Acid Adding Process

The acid adding process may be conducted similar to the first embodiment. This process may be conducted after the separation by sedimentation or before the MF membrane treatment.

RO Membrane Treatment Process

The RO membrane treatment process may also be conducted similar to the first embodiment.

While, instead of a RO membrane treatment, forward osmosis (hereinafter: FO) membrane treatment may be conducted.

The FO is a method of contacting the second reaction solution obtained in the acid adding process with a draw solution having a higher osmotic pressure than it through a semi-permeable membrane, and allowing water to migrate in the second reaction solution to the draw solution through the semi-permeable membrane, and a semi-permeable membrane apparatus is used.

The draw solution is an aqueous solution having a higher osmotic pressure than the above membrane filtrate, and an example is aqueous ammonium carbonate salt solution produced by dissolving a prescribed amount of ammonia and carbon dioxide in water. The prescribed amount is an amount that forms a concentration capable of migrating water in the membrane filtrate to the draw solution by passing through the semi-permeable membrane, and is set so that the osmotic pressure of the draw solution becomes higher than the osmotic pressure of the membrane filtrate. In the case of using ammonium carbonate solution, the upper limit of the concentration is selected so that a salt of ammonia and carbon dioxide, i.e., ammonium carbonate, ammonium hydrogen carbonate, ammonium carbamate, or the like, does not deposit on the face of a semi-permeable membrane or distillation column, and can be determined through experimentation. A confirmation whether deposits generate on the face of semi-permeable membrane or the inside of distillation column can be done by the judgment whether a long term operation is possible stably or not. A molar ratio of ammonia to carbon dioxide is about 1.5-3, and the molar ratio is considered so that a salt of ammonia and carbon dioxide does not deposit on the face of semi-permeable membrane or the inside of distillation column.

Other solutes of the draw solution applicable herein have a high solubility to exhibit high osmotic pressure, have a lower boiling point and high volatility and low toxicity, and, for example, alcohols, such as ethyl alcohol and butyl alcohol, ketones, such as acetone, can be used.

A suitable semi-permeable membrane can permeate water selectively, and a FO membrane is preferred, but RO membrane can also be used. The material is not particularly restricted, and for example, cellulose acetate, polyamide, polyethylene imine, polysulfone, polybenzimidazole can be used. The shape of the semi-permeable membrane is also not restricted, and may be any of flat membrane, tubular membrane, hollow fiber, or the like.

The apparatus in which the semi-permeable membrane is attached has a configuration such that the semi-permeable membrane is usually set in a cylindrical or box-shaped vessel, and the second reaction solution is run in a chamber partitioned by the semi-permeable membrane, and the draw solution is run into the other chamber. The semi-permeable membrane apparatus may be known one, and commercial apparatus can be used.

Evaporation Process, Crystallization Process

The evaporation process and the crystallization process may be conducted similarly.

A second embodiment of the process as above can be carried out by using the apparatus for treating accompanied water, including a streaming device for the accompanied water containing calcium ion, soluble silica, and water-soluble organic material produced from a well, a device for adding a water-soluble magnesium salt and a water-soluble aluminum salt at a prescribed blending amount, an alkali adding device, a first reaction vessel having a run off device for liquid in the vessel, a flocculation vessel having a streaming device for the first reaction solution in the first reaction vessel and an addition device for a flocculant, a solid-liquid separation device for flocculated solution run off from the flocculation vessel, a streaming device for separated water run off from the solid-liquid separation means, an acid addition device, a second reaction vessel having a run off device for liquid in the vessel, and a reverse osmosis membrane apparatus provided on the downstream side of the second reaction vessel, wherein a first adjustment device for adjusting the liquid in the first reaction vessel into the range from pH 10.5 to 11, and a second adjustment device for adjusting the second reaction solution run off from the second reaction vessel into the range from pH 5 to 9 and the Langeliar saturation index into the negative range, are provided.

An embodiment of the apparatus for treating accompanied water will be explained in reference to FIG. 2.

Figure 2:
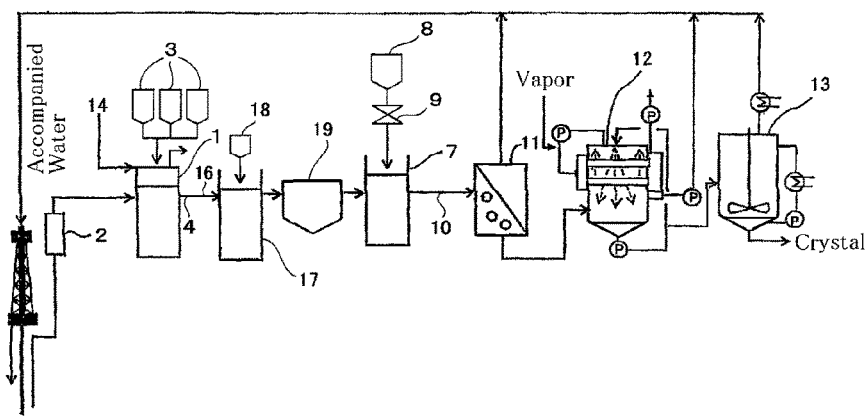
FIG. 2 is a drawing illustrating a schematic construction of an accompanied water-treating apparatus which is another exemplary embodiment of the invention.

In FIG. 2, 1 is a first reaction vessel which is the same as the first reaction vessel in FIG. 1, except that the magnesium added by the agent adding device is water-soluble magnesium, that a tank for containing the water-soluble magnesium, a pipe connecting the tank to the first reaction vessel, and a flow control valve are provided, and that the reaction vessel is closed and a nitrogen gas feed pipe and an exhaust pipe are connected to the upper gas phase portion as a nitrogen gas substitution device.

Figure 3:
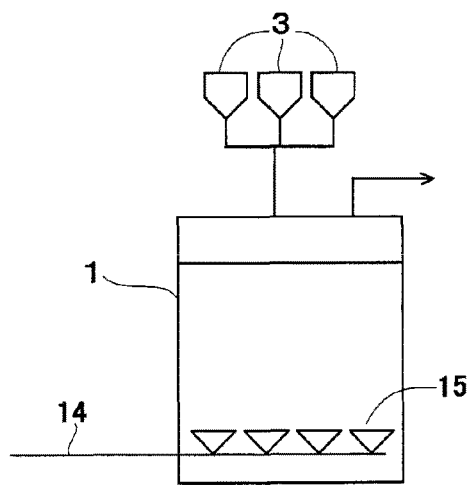
FIG. 3 is a drawing illustrating another example of the first reaction vessel in FIG. 2.

Another embodiment of the first reaction vessel is shown in FIG. 3. This first reaction vessel 1 is the same as the first reaction vessel in FIG. 2, except that the nitrogen gas feed pipe is connected to the bottom of the reaction vessel and a diffuser 15, for sparging the inside, is provided.

The first reaction solution run off from the first reaction vessel 1 by the run off device 4 enters the flocculation vessel 17 through the streaming device 16. The streaming device 16 is composed of pipes, an on-off value, a pump, and the like. The flocculation vessel 17 is provided with a stirrer and a polymer flocculant adding device 18 including a tank for containing the polymer flocculant, pipes, a flow control valve, a volumetric pump, and the like.

The exit of the flocculation vessel 17 is connected to a solid-liquid separation device 19. The solid-liquid separation means 19 is a sedimentation tank of flocculated matter, or a MF membrane treatment.

The exit of the solid-liquid separation device 19 is connected to the second reaction vessel 7, and thereafter, the apparatus is the same as the first embodiment.

Example 1

100 L of an accompanied water produced from a well containing 5,000 mg/L calcium ion, 120 mg/L soluble silica, and 300 mg/L sulfate ion was adjusted to pH 10.5 by adding 5 N aqueous caustic soda solution, and aqueous magnesium chloride solution (added amount of Mg: 10 g) was added thereto. It was stirred slowly at room temperature for 30 minutes to deposit insoluble silica and calcium sulfate. The first reaction solution thus obtained was filtered by a MF membrane having a pore size of 0.1 μm to obtain 90 L of filtrate of pH 10.4 containing 4,900 mg/L calcium ion.

The pH of the filtrate was made 6.5 by adding 1 N hydrochloric acid. The Langeliar saturation index of this solution was −0.6. When the pH was made 7.5 by adding hydrochloric acid, the Langeliar saturation index of the solution was +0.5.

The second reaction solution having a Langeliar saturation index of −0.6 thus obtained was treated with a RO membrane to obtain 45 L of fresh water and 45 L of RO membrane concentrates. This solution could be operated stably for a long period without deposition of calcium carbonate on the face of the RO membrane. For the second reaction solution having a Langeliar saturation index of +0.5, the quantity of permeated water lowered from the beginning of operation by the deposition of calcium carbonate on the face of the RO membrane, and finally permeated solution could not be obtained. The RO membrane concentrates obtained by the RO membrane treatment were further concentrated by an evaporator and condensed to obtain 30 L of fresh water and 15 L of further concentrates.

The further concentrates were put in a crystallization apparatus, and further concentrated and condensed to obtain 14.5 L of fresh water. The residual liquid was 0.5 L, and salts were deposited in quantity.

Example 2

To 100 L of an accompanied water produced from a well containing 5,000 mg/L calcium ion, 120 mg/L soluble silica, and 400 mg/L water-soluble organic material, 62.5 g of magnesium chloride 6 hydrates (Mg: 7.5 g) and 26 g of 10% poly(aluminum chloride) solution (Al: 1.4 g) ware added. The added amount was at a ratio of 1 by the molar ratio of (Mg+Al)/SiO2 and at a ratio of 3 by the molar ratio of Mg/Al. Then, the pH was adjusted to 10.5 by adding 5 N aqueous caustic soda solution, and stirred slowly at room temperature for 30 minutes to deposit insoluble silica to obtain a first reaction solution. Subsequently, to this first reaction solution, 100 mL of 1 g/L weakly anionic flocculant solution, which is a polymer flocculant, was added, and deposits were flocculated by allowing it to stand at room temperature for 1 hour. The first reaction solution treated with flocculation was subjected to solid-liquid separation by a centrifuge to separate the deposits to obtain 90 L of separated water of pH 10.4 containing 4,900 mg/L calcium ion.

The separated water was made pH 6.5 by adding 1 N hydrochloric acid. The Langeliar saturation index of this solution was −0.6.

The second reaction solution thus obtained was treated with a RO membrane to obtain 45 L of fresh water and 45 L of RO membrane concentrates. This solution could be operated stably for a long period without deposition of calcium carbonate on the face of the RO membrane.

The RO membrane concentrates obtained by the RO membrane treatment were further concentrated by an evaporator and condensed to obtain 30 L of fresh water and 15 L of further concentrates.

The further concentrates were put in a crystallization apparatus, and further concentrated and condensed to obtain 14.5 L of fresh water. The residual liquid was 0.5 L, and salts were deposited in quantity.

As described herein, silica is separated efficiently from accompanied water produced from wells, and clogging in the membrane filtration process does not occur by the deposition of calcium carbonate. Therefore, the processes can be utilized widely for methods of treating the accompanied water to obtain fresh water.

DESCRIPTION OF REFERENCE SIGNS

1 First reaction vessel
2 Streaming device
3 Agent adding device
4 Run off device
5 MF membrane filtration apparatus
6 Streaming device
7 Second reaction vessel
8 Acid adding device
9 Adjustment device
10 Run off device
11 RO membrane treatment device
12 Evaporation apparatus
13 Crystallization apparatus
14 Nitrogen gas substitution device
15 Diffuser
16 Streaming device
17 Flocculation vessel
18 Polymer flocculant adding device
19 Solid-liquid separation device While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A method of treating accompanied water containing calcium ion, soluble silica, 10-1,000 mg/L carbonates, and sulfate ion produced from a well, the method comprising:
    a magnesium salt adding process, including adding a magnesium salt to mix with the accompanied water under alkaline conditions to precipitate insoluble silica, calcium carbonate, calcium sulfate, and produce a supernatant from which said insoluble silica and calcium sulfate have been precipitated having a pH of 10.5-11, in a first reaction solution;
    a microfiltration membrane treatment process, including filtering said first reaction solution with a microfiltration membrane to separate the insoluble silica, calcium carbonate, and calcium sulfate, to generate a filtrate, and wherein carbonate ion concentration of the filtrate is 1 mg/L or less;
    an acid adding process, including adding an acid to and mixing with said filtrate to render a pH value of said filtrate in the range from 5 to 9 and a negative Langeliar saturation index, to generate a second reaction solution; and
    a reverse osmosis membrane treatment process, including treating said second reaction solution with a reverse osmosis membrane to obtain fresh water and reverse osmosis membrane concentrates.

2. The method of treating accompanied water as set forth in claim 1, further comprising:
    an evaporation process including heating said membrane concentrates to generate vapor, and condensing said generated vapor to obtain fresh water and simultaneously to obtain further concentrates.

3. The method of treating accompanied water as set forth in claim 2, further comprising:
    a crystallization process including heating said further concentrates to crystallize salts contained in said further concentrates, followed by separating said salts, and condensing generated vapor to obtain fresh water.

4. The method of treating accompanied water as set forth in claim 1, further comprising:

reusing at least a part of said fresh water for digging said well.

\* \* \* \* \*